(12) United States Patent
Yamamoto et al.

(10) Patent No.: US 9,019,347 B2
(45) Date of Patent: Apr. 28, 2015

(54) IMAGE GENERATOR

(71) Applicant: Aisin Seiki Kabushiki Kaisha, Kariya-shi, Aichi (JP)

(72) Inventors: Kinji Yamamoto, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 377 days.

(21) Appl. No.: 13/650,544

(22) Filed: Oct. 12, 2012

(65) Prior Publication Data
US 2013/0093851 A1 Apr. 18, 2013

Related U.S. Application Data

(60) Provisional application No. 61/546,717, filed on Oct. 13, 2011.

(51) Int. Cl.
| H04N 13/02 | (2006.01) |
| G01S 15/58 | (2006.01) |
| G01S 15/93 | (2006.01) |
| G01S 13/93 | (2006.01) |
| G01S 13/86 | (2006.01) |

(52) U.S. Cl.
CPC .............. G01S 15/58 (2013.01); G01S 15/931 (2013.01); G01S 13/867 (2013.01); G01S 13/931 (2013.01); G01S 2013/9353 (2013.01)

(58) Field of Classification Search
CPC .............................. G01S 13/867; G01S 13/931
See application file for complete search history.

(56) References Cited

U.S. PATENT DOCUMENTS

| 2003/0085999 A1 | 5/2003 | Okamoto et al. |
| 2005/0031169 A1 | 2/2005 | Shulman et al. |

(Continued)

FOREIGN PATENT DOCUMENTS

EP   1302365 A2   4/2003

(Continued)

OTHER PUBLICATIONS

Communication dated Jan. 13, 2015, issued by the European Patent Office in counterpart Application No. 12186772.5.

Primary Examiner — Andy Rao
Assistant Examiner — Tyler Edwards
(74) Attorney, Agent, or Firm — Sughrue Mion, PLLC

(57) ABSTRACT

An image generator is provided which generates a monitor display image that facilitates easy recognition of a three-dimensional object in an overhead view image. An image generator includes: an overhead view image generation section for generating an overhead view image by performing a projective transformation, with a virtual viewpoint above a vehicle, of an image captured by an on-board camera for capturing an image of a surrounding region of the vehicle; a three-dimensional object detection section for recognizing a three-dimensional object present in the surrounding region and outputting three-dimensional object attribute information showing an attribute of the three-dimensional object; and an image composition section for generating a monitor display image for vehicle driving assistance by performing image composition of a grounding plane mark showing a grounding location of the three-dimensional object with a portion at the grounding location in the overhead view image, based on the three-dimensional object attribute information.

9 Claims, 8 Drawing Sheets

(56) References Cited

U.S. PATENT DOCUMENTS

2007/0085901 A1     4/2007  Yang et al.
2008/0198226 A1     8/2008  Imamura
2010/0245578 A1*    9/2010  Kakinami ................... 348/148
2010/0259372 A1    10/2010  Hideshiro
2011/0285848 A1    11/2011  Han et al.

FOREIGN PATENT DOCUMENTS

| EP | 1775952 A2    | 4/2007  |
| EP | 2233358 A1    | 9/2010  |
| JP | 2010-251939 A | 11/2010 |
| KR | 100966288 B1  | 6/2010  |

* cited by examiner

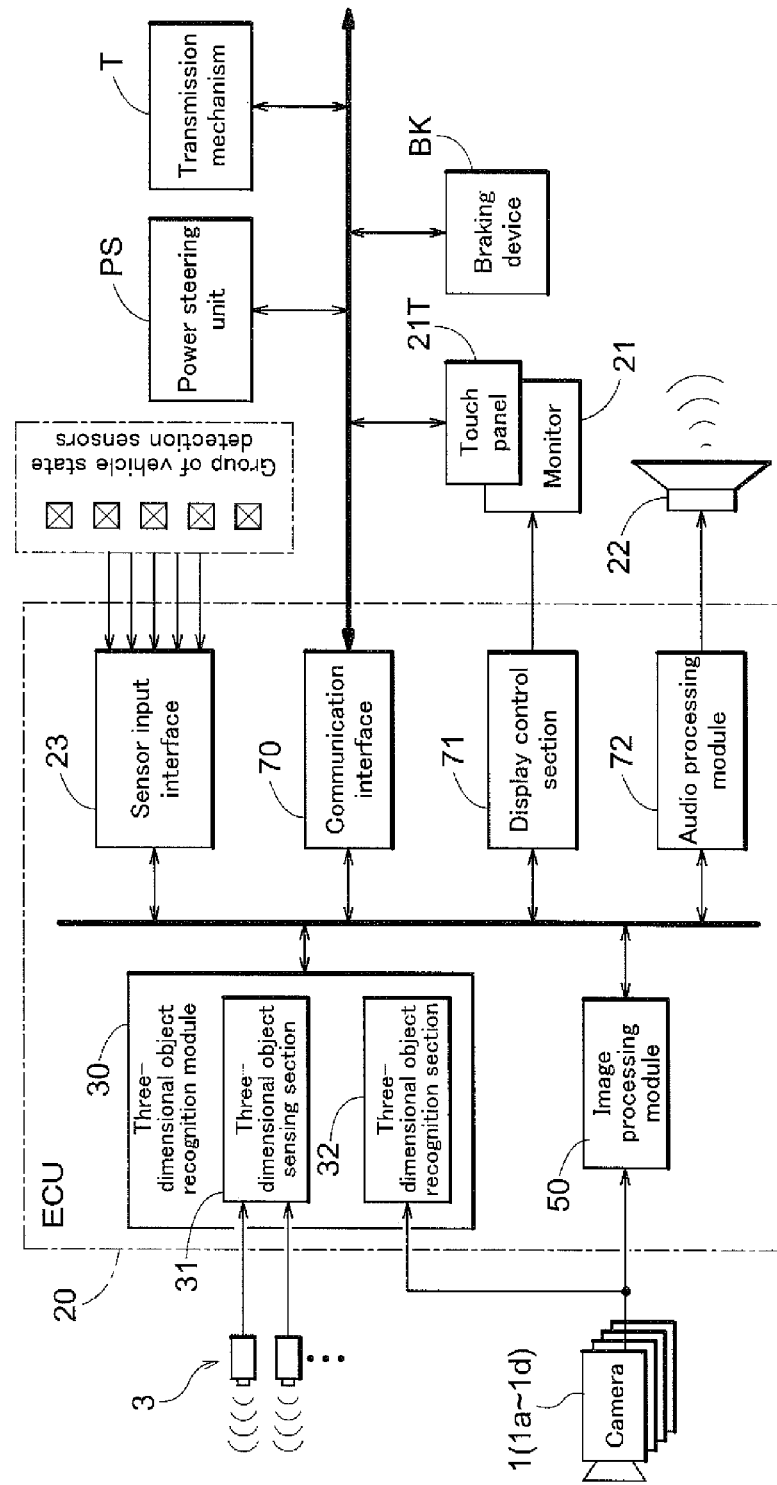

IMAGE GENERATOR

CROSS REFERENCE TO RELATED APPLICATION

This application is based on and claims priority under 35 U.S.C. §119 to the US provisional application 61/546,717, filed on Oct. 13, 2011, the entire content of which is incorporated herein by reference.

TECHNICAL FILED

This disclosure relates to an image generator for outputting an overhead view image as monitor display image, the overhead view image being generated by performing a projective transformation, with a virtual viewpoint above a vehicle, of an image captured by an on-board camera for capturing an image of a surrounding region of the vehicle.

BACKGROUND DISCUSSION

In a conventional overhead view image generator, an overhead view image from directly above a vehicle is generated using an image transformation principle in which an image captured by an on-board camera is projected on a projection plane in parallel with a road surface, in other words, using a projective transformation in which a virtual viewpoint is positioned vertically above the vehicle. By displaying the overhead view image on a monitor, a driver is allowed to grasp a road surface state around the vehicle in a bird's-eye way. However, in the overhead view image obtained through such a projective transformation, a three-dimensional object standing on the road surface is elongated in an image capturing direction of the camera, and thus it becomes difficult for the driver to grasp a shape of the actual three-dimensional object from the overhead view image. In addition, when the overhead view image that covers the entire surroundings of the vehicle is generated from the captured images of a plurality of the on-board cameras, image composition of common regions in the adjacent captured images, i.e. overlap regions, has been generally performed. In the case of such an overhead view image, the image capturing directions of the respective original captured images of the overlap regions differ to a large extent, and the three-dimensional object present in the overlap region is elongated in two directions. As a result, the three-dimensional object appears as two three-dimensional object images in deformed shapes, and it becomes difficult to recognize the three-dimensional object, especially a standing position thereof, making a sense of a distance between the vehicle and the three-dimensional object ambiguous.

In order to solve such a problem, for example, Japanese Unexamined Patent Application Publication No. 2010-251939 (paragraphs [0004]-[0056], FIGS. 7 and 10) proposed a vehicle surroundings image display system including: a camera for capturing an image of vehicle surroundings; an obstacle detection means for detecting an obstacle in the vehicle surroundings; a memory section for storing in advance a substitute image corresponding to the obstacle; and an image processing section for generating the overhead view image of the vehicle surroundings from the virtual viewpoint based on the image captured by the camera, wherein, when the obstacle detection means detects the obstacle (three-dimensional object), the image processing section identifies the obstacle, selects a substitute image corresponding to the identified obstacle, reads the selected substitute image from the memory section, adjusts a direction and an inclination of the selected substitute image in accordance with the virtual viewpoint, and superimposes the adjusted image on the overhead view image. In this system, the image processing section transforms the image captured by an imaging means into the overhead view image from above the vehicle or from a side of the vehicle, and based on information from the obstacle detection means, the image processing section selects the substitute image from the memory section which is consistent with a size and movement of the obstacle present in the vehicle surroundings, and superimposes the selected image on the same overhead view image.

However, in a case where the substitute image in a shape of a human is displayed instead of an obstacle image showing the actual obstacle, if the shapes are different to a large degree between the substitute image and the actual obstacle, it becomes difficult for the driver to identify the substitute image as the obstacle actually confirmed with the naked eye, hindering a rapid obstacle recognition.

In view of the above, there has been a demand for an image generator for generating the monitor display image that facilitates easy recognition of the three-dimensional object in the overhead view image, especially a standing position of the three-dimensional object.

SUMMARY

In one aspect of this disclosure, the image generator in accordance with one or more embodiments includes: an overhead view image generation section for generating an overhead view image by performing a projective transformation, with a virtual viewpoint above a vehicle, of an image captured by an on-board camera for capturing an image of a surrounding region of the vehicle; a three-dimensional object detection section for recognizing a three-dimensional object present in the surrounding region and outputting three-dimensional object attribute information showing an attribute of the three-dimensional object; and an image composition section for generating a monitor display image for vehicle driving assistance by performing image composition of a grounding plane mark showing a grounding location of the three-dimensional object with a portion at the grounding location in the overhead view image, based on the three-dimensional object attribute information.

BRIEF DESCRIPTION OF THE DRAWINGS

FIG. 8 is a functional block diagram of the vehicle surroundings monitoring system to which an image generator according to another embodiment is applied.

DETAILED DESCRIPTION

Figure 1:
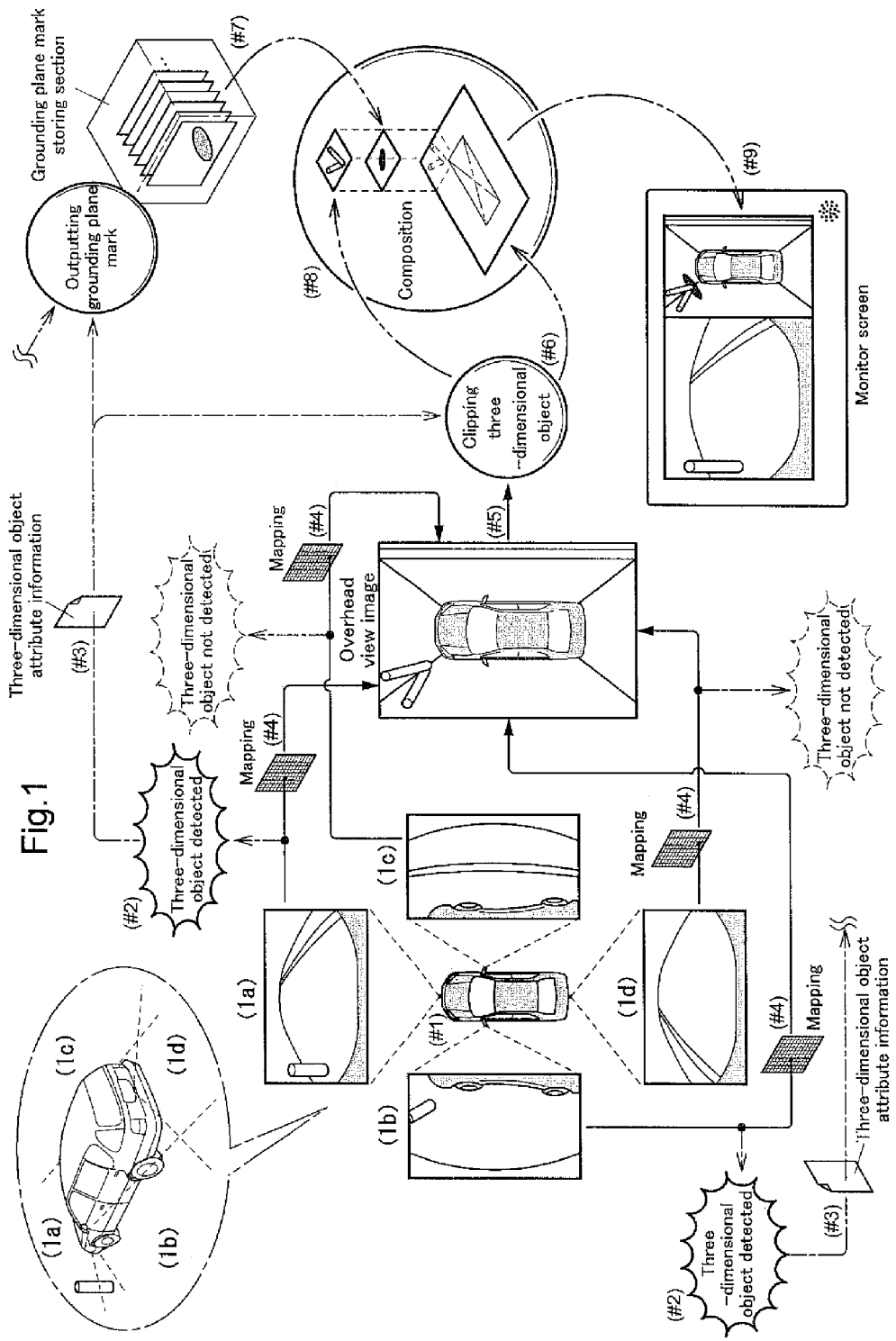
FIG. 1 is a schematic drawing explaining a basic concept of this disclosure for arranging a grounding plane mark at a grounding location of a three-dimensional object in an overhead view image.

A first embodiment disclosed here will be explained with reference to the attached drawings.

In one aspect of this disclosure, the image generator in accordance with one or more embodiments includes: an overhead view image generation section for generating an overhead view image by performing a projective transformation, with a virtual viewpoint above a vehicle, of an image captured by an on-board camera for capturing an image of a surrounding region of the vehicle; a three-dimensional object detection section for recognizing a three-dimensional object present in the surrounding region and outputting three-dimensional object attribute information showing an attribute of the three-dimensional object; and an image composition section for generating a monitor display image for vehicle driving assistance by performing image composition of a grounding plane mark showing a grounding location of the three-dimensional object with a portion at the grounding location in the overhead view image, based on the three-dimensional object attribute information.

Herein, the attribute of the three-dimensional object means location, posture, size, type, color or the like of the three-dimensional object present in field of view of the on-board camera, and an attribute value of the three-dimensional object showing this attribute is contained in the three-dimensional object attribute information.

According to this configuration, the overhead view image in which the grounding plane mark is additionally drawn at the grounding location as standing position of the three-dimensional object is generated as monitor display image, and therefore, even though the three-dimensional object is shown with a deformed shape which is elongated in the image-capturing direction, a driver is allowed to clearly grasp the grounding location of the three-dimensional object by means of the grounding plane mark. Especially, even though the three-dimensional object is present in overlap regions of the adjacent captured images and thus the three-dimensional object is displayed as a deformed three-dimensional object image, a grounding plane of the three-dimensional object as a common region in the three-dimensional object image is shown with the grounding plane mark. Therefore, even in such a case, the driver can grasp the standing position of the three-dimensional object by means of the monitor display image.

As a specific shape of the grounding plane mark, in one preferred embodiment of this disclosure, the grounding plane mark is in a flattened shape, preferably in a shape of an ellipse, and an inclined posture of the grounding plane mark is determined so that a line of direction from the vehicle to the three-dimensional object becomes orthogonal to a major axis of the ellipse. By making the grounding plane mark in a flattened shape, and by setting an arrangement posture of the grounding location of the three-dimensional object so as to become orthogonal to the line of direction from the vehicle (for example, a vehicle center or an on-board camera center) to the three-dimensional object, the driver can grasp the direction in which the three-dimensional object is present relative to the vehicle, from the inclined posture of the grounding plane mark. In addition, when the grounding plane mark is in a shape of an ellipse, a contour has a smooth edge and thus an edge obtained after image composition becomes smooth and easily viewable.

A grounding plane size of the three-dimensional object in the overhead view image varies depending on a distance from the vehicle or a type of the three-dimensional object. Therefore, in one preferred embodiment of this disclosure, it is convenient that a size of the grounding plane mark is determined in accordance with the three-dimensional object attribute information. In another preferred embodiment of this disclosure, it is convenient that a size of the grounding plane mark is set larger than a width of the three-dimensional object in the overhead view image, based on a width of the three-dimensional object contained in the three-dimensional object attribute information. With these configuration, there can be reduced inconveniences, such as an inconvenience in which the grounding plane mark is too small as compared with the grounding plane size of the three-dimensional object and thus it is difficult to relate the grounding plane to the grounding plane mark of the three-dimensional object, and an inconvenience in which the grounding plane mark is too large as compared with the grounding plane size of the three-dimensional object and thus the grounding plane mark makes it difficult to see the three-dimensional object.

As preferred embodiments for performing image composition of the grounding plane mark with the grounding location of the three-dimensional object in the overhead view image, the following two embodiments can be mentioned.

In one embodiment, in the image composition performed by the image composition section, a three-dimensional object image layer containing the three-dimensional object alone is generated from a basic image layer containing the overhead view image, the grounding plane mark is placed between the basic image layer and the three-dimensional object image layer, and at the same time, positioned at the grounding location of the three-dimensional object in the overhead view image. In other words, since the grounding plane mark is pasted as a background of the three-dimensional object in the overhead view image, a sense of depth is given to the three-dimensional object, making the three-dimensional object and the grounding plane mark more visible. In addition, since the three-dimensional object is not concealed by the grounding plane mark, the driver can intuitively understand that the grounding plane mark shows the grounding plane of the three-dimensional object.

In another embodiment, in the image composition performed by the image composition section, the grounding plane mark is superimposed on the grounding location of the three-dimensional object in the overhead view image. In this embodiment, the grounding plane mark is simply pasted at the grounding location of the three-dimensional object in the overhead view image, and thus the image composition can be achieved with a simple image processing. In this case, it is convenient to make a base region of the three-dimensional object visible to some extent, by making the grounding plane mark transparent in several tens of percent.

If the grounding plane mark is drawn every time, a burden is given in preprocessing time. Therefore, it is preferable that the overhead view image generation section includes a grounding plane mark storing section for storing a plurality of the grounding plane marks; and a grounding plane mark output section for extracting an appropriate grounding plane mark from the grounding plane mark storing section based on the three-dimensional object attribute information, and sending the selected grounding plane mark to the image composition section. Especially, in a case where the inclined posture or the size of the grounding plane mark is changed in accordance with location of the three-dimensional object, it is convenient to store all of the possibly usable grounding plane marks in the grounding plane mark storing section so that composition processing becomes simple.

When the three-dimensional object is recognized, it is important for the driver to know how far the own vehicle is located from the grounding location which is the standing position of the three-dimensional object. Therefore, in one preferred embodiment, an indication of a distance from the grounding location of the three-dimensional object to the vehicle is added in the vicinity of the grounding plane mark. With this configuration, information of the three-dimensional object needed by the driver can be checked at a glance of a monitor display screen.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

Before specific embodiments are described, a basic concept of this disclosure will be described with reference to a schematic drawing of FIG. 1. In order to capture images of the entire surroundings of a vehicle, cameras 1a-1d are mounted on front, left, right and rear sides of the vehicle. For displaying an overhead view image as a vehicle surroundings monitoring screen on a monitor, first, images of surrounding regions of the own vehicle are captured by the cameras (#1). Herein, the captured images are used also in a detection processing of a three-dimensional object as obstacle around the vehicle. For detecting the three-dimensional object, a general image recognition processing is used, and alternatively, a three-dimensional object detection using ultrasonic wave, laser radar method, or infrared method may be used, or such a processing and such a detection may be used in combination. In this specific instance, the three-dimensional object to be processed is a cylindrical object placed on a front left side of the vehicle. The cylindrical object appears in both a front captured image and a left captured image.

Because an image recognition algorithm of three-dimensional object is well known, detailed descriptions are omitted here, but the three-dimensional object is recognized by, for example: determining whether the object is a dynamic body or a stationary body with using motion vector method or difference method; specifying a shape by size measurement or edge detection; and identifying a type of the object based on color information (#2). In addition, the three-dimensional object may be recognized in more detail through image recognition using the captured image, based on the sensing information after sensing the three-dimensional object with using ultrasonic wave, laser radar or the like. Through the image recognition, there are generated three-dimensional object attribute information containing attribute values of the three-dimensional object, such as location, posture, size, type and color of the three-dimensional object present in field of view of the on-board camera (#3).

On the other hand, using each of the captured images, a projective transformation in which a projection plane is in parallel with the road surface is performed, that is, the projective transformation is performed using a mapping in which a viewpoint transformation where a virtual viewpoint is set directly above the vehicle is set in advance (#4). By combining image segments for the overhead view image obtained through this projective transformation processing in such a manner that common regions overlap with each other, the overhead view image of vehicle surroundings seen from directly above the vehicle can be obtained (#5). In the overhead view image, border lines are drawn for separating the overhead view image into a frontward image region, a right side image region, a left side image region and a rearward image region.

Subsequently, a three-dimensional object region in the overhead view image of the detected three-dimensional object is clipped from the overhead view image, based on the three-dimensional object attribute information (#6). In addition, in this instance, a grounding plane mark showing a grounding plane of the three-dimensional object which mark is suitable for the three-dimensional object detected based on the three-dimensional object attribute information is extracted from a grounding plane mark storing section. Alternatively, the grounding plane mark may be created every time (#7).

Figure 2:
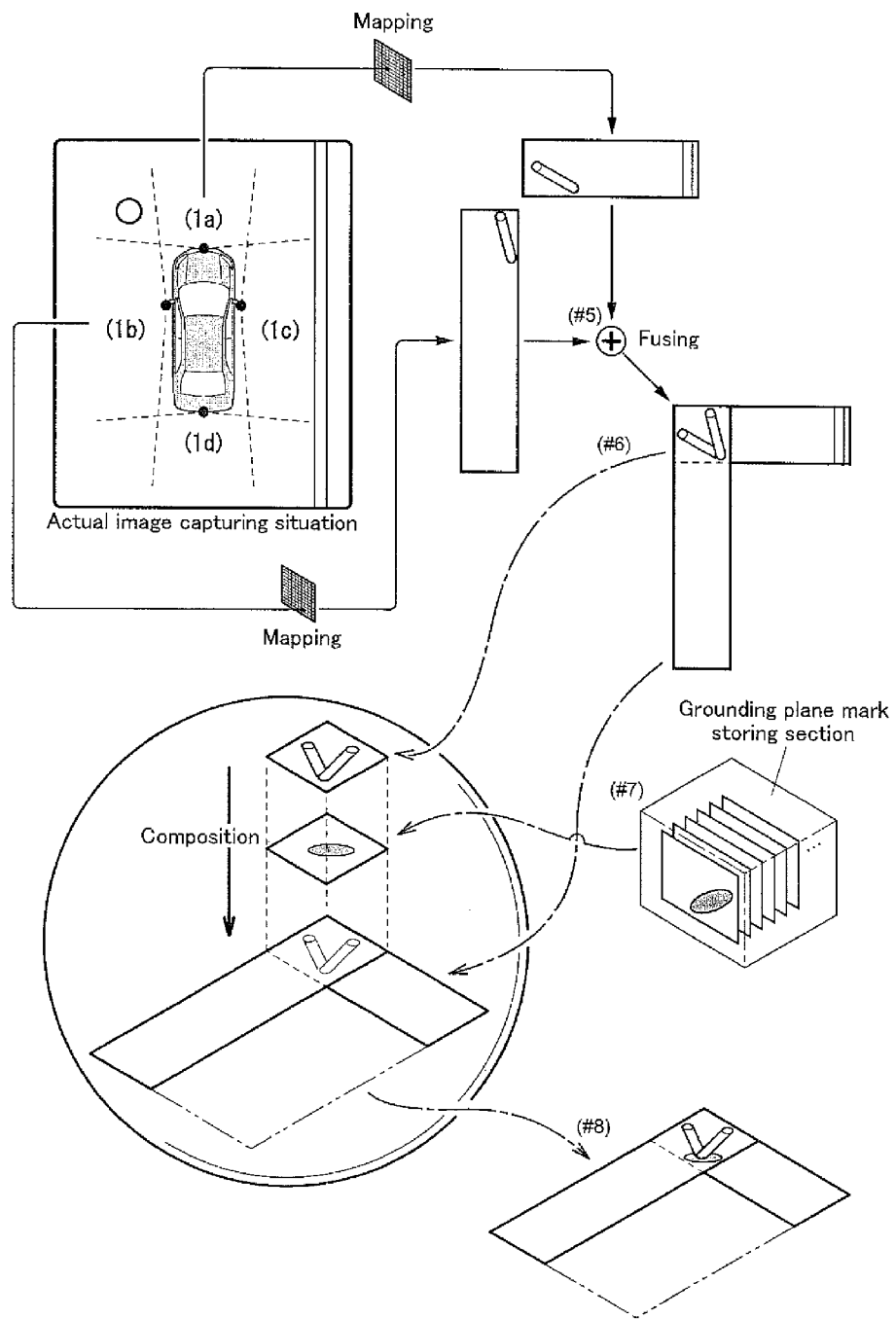
FIG. 2 is a schematic drawing explaining image composition of the overhead view image with the grounding plane mark in a three-dimensional object region.

Image composition of all the overhead view image from which the three-dimensional object region was clipped, the clipped three-dimensional object region, and the extracted grounding plane mark, is performed, as shown in FIG. 2, in a layer composition order of: the overhead view image from which the three-dimensional object region was clipped (rearmost layer), the grounding plane mark (back layer), and the clipped three-dimensional object region (front layer) (#8). With this image composition, the three-dimensional object is never concealed by the grounding plane mark, and it is more apparent that the grounding plane mark shows the grounding plane of the three-dimensional object. Of course, instead of this image composition, the grounding plane mark may be directly superimposed on the overhead view image containing the three-dimensional object region.

The image generated by the image composition is transmitted as monitor display image to the monitor, and displayed on a monitor screen together with one or more captured images selected as needed (#9).

It should be noted that, as shown in FIG. 2, when overlap regions of the adjacent captured images are superimposed and blended (fused), two three-dimensional object images elongated in each image-capturing direction will appear. However, according to the image composition as illustrated in the drawing, the grounding plane as a common region is clearly shown using a grounding plane marker, and thus even when the three-dimensional object is displayed as two deformed three-dimensional object images, a driver can easily grasp a distance from the three-dimensional object through the monitor screen.

Figure 3:
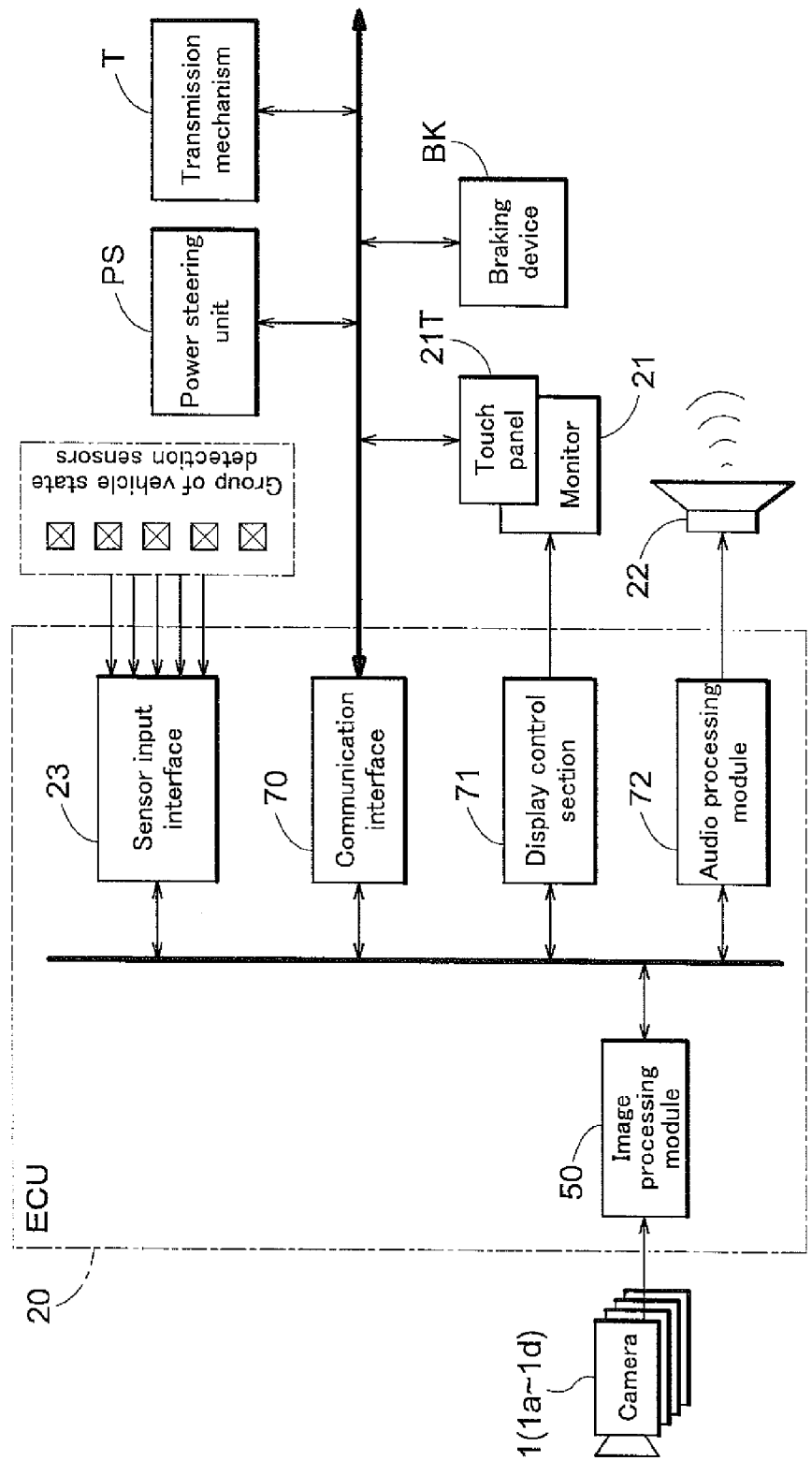
FIG. 3 is a functional block diagram of a vehicle surroundings monitoring system to which an image generator according to this disclosure is applied.

Hereinbelow, embodiments will be described with reference to the drawings. FIG. 3 is a functional block diagram showing a control system forming a vehicle surroundings monitoring system to which an image generator according to the embodiment is applied.

The vehicle having the vehicle surroundings monitoring system mounted thereon is provided with four on-board cameras 1, specifically, the front camera 1a, the rear camera 1d, the left side camera 1b, and the right side camera 1c. An omni-directional overhead view image is created from the images captured by the on-board cameras 1. In the following descriptions, when appropriate, the on-board cameras 1a, 1b, 1c, 1d may be collectively referred to as "camera 1". When a vehicle surroundings monitoring control is operated, the image captured by the camera 1 or the overhead view image generated using the captured images is displayed on the monitor. The camera is a digital camera for capturing images of the vehicle surroundings sequentially at intervals, digitally transforming the captured image and outputting the digitally transformed image in real time. The camera 1 is provided with ether a wide-angle lens or a fisheye lens.

An ECU 20 that forms a core component of the vehicle surroundings monitoring system includes, as shown in FIG. 3, a sensor input interface 23 or a communication interface 70 for transmitting signal inputs from a group of vehicle state detection sensors, as-is or after evaluated them, to an inside of the ECU 20; a microprocessor for processing input information; a DSP; and the like.

A group of the vehicle state detection sensors connected to the sensor input interface 23 are configured to detect conditions of drive operation or vehicle running. Though not shown, a group of the vehicle state detection sensors includes: a steering sensor for detecting a steering operation direction (steering direction) and measuring an operational amount (steering amount); a shift position sensor for detecting a shift position of a shift lever; an accelerator sensor for measuring an operational amount of an accelerator pedal; a brake sensor for detecting an operational amount of a brake pedal; and a distance sensor for detecting a travel distance of the own vehicle.

In addition, to the communication interface 70 used as input/output interface, an in-vehicle LAN can be adopted as data transmission line, to which control units, such as a monitor 21, a touch panel 21T, a power steering unit PS, a transmission mechanism T, and a braking device BK, are connected in a data-transmissive manner. Moreover, a speaker 22 is also provided as device for outputting audio information.

Furthermore, the ECU 20 includes various functional sections formed of hardware and/or software, and the functional sections especially related to the embodiment include: an image processing module 50; a display control section 71; and an audio processing module 72. The monitor display image generated in the image processing module 50 is converted into a video signal in the display control section 71 and sent to the monitor 21. An audio guide, an emergency warning sound or the like generated in the audio processing module 72 is played by the speaker 22.

Figure 4:
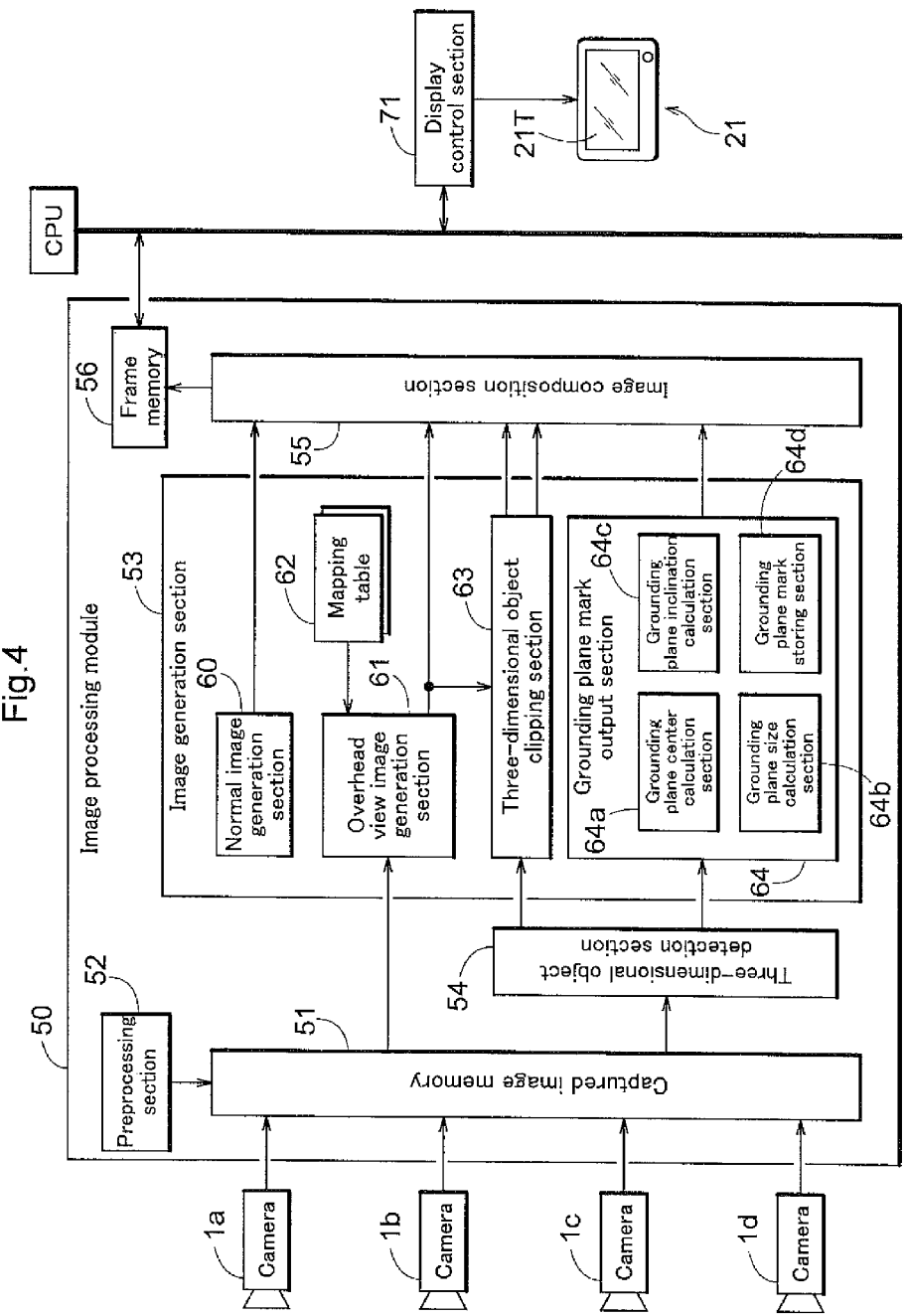
FIG. 4 is a functional block diagram of an image processing module forming the vehicle surroundings monitoring system.

FIG. 4 shows a functional block diagram of the image processing module 50 of the ECU 20. The image processing module 50 has a function of generating an image, such as the overhead view image, by the projective transformation from the image captured by the camera 1 for capturing an image around the own vehicle.

The image processing module 50 includes a captured image memory 51, a preprocessing section 52, an image generation section 53, a three-dimensional object detection section 54, an image composition section 55, and a frame memory 56. The image captured by the camera 1 is loaded into the captured image memory 51, and the preprocessing section 52 adjusts luminance balance, color balance and the like between the images separately captured by the cameras 1. The three-dimensional object detection section 54 is configured to detect the three-dimensional object contained in the captured image by using an object image recognition algorithm which is well-known. The three-dimensional object attribute information of the detected three-dimensional object, such as location, size, color, and posture of the three-dimensional object, is sent to the image generation section 53.

The image generation section 53 includes a normal image generation section 60, an overhead view image generation section 61, a mapping table 62, a three-dimensional object clipping section 63, and a grounding plane mark output section 64.

The normal image generation section 60 is configured to adjust the captured image to have an appropriate image quality to be displayed directly on the monitor as a vehicle surroundings image. The vehicle surroundings image displayed on the monitor may be a single image selected by the driver from the images captured by the front camera 1a, the left side camera 1b, the right side camera 1c, and the rear camera 1d, or may be a combination of a plurality of the captured images.

The overhead view image generation section 61 has a function of generating the overhead view image by performing the projective transformation, with the virtual viewpoint above the vehicle, of a single or a plurality of the captured image loaded into the captured image memory 51, specifically, generating the overhead view image by a map transformation using the mapping table 62. In the mapping table 62, various maps for the projective transformation used herein are stored in advance in a selectable manner. Each map stored in the mapping table 62 may be formed in various forms, and in this embodiment, formed as a map including a correspondence relationship between pixel data of the captured image and pixel data of a projective transformation image (in general the overhead view image). Especially, each pixel of the captured image of a single frame has been described with a destination pixel coordinate in the overhead view image, and a suitable map is applied to each of the on-board cameras. The overhead view image generation section 61 has a function of selecting a suitable map from the mapping table 62, based on an external command or an internal command.

In the present embodiment, as shown in FIG. 2, a composition technique is applied in which a composition is performed so that the grounding plane mark is arranged on a back side of the three-dimensional object image region, in order not to make the grounding plane mark conceal a three-dimensional object image region in the overhead view image where the three-dimensional object detected by the three-dimensional object detection section 54 is present. Accordingly, when the three-dimensional object is detected by the three-dimensional object detection section 54, the three-dimensional object clipping section 63 clips the three-dimensional object image region from the overhead view image, based on the three-dimensional object attribute information sent from the three-dimensional object detection section 54. The clipped three-dimensional object image and the overhead view image are transmitted to the image composition section 55.

The grounding plane mark output section 64 has a function of outputting, to the image composition section 55, the grounding plane mark which is suitable for showing a grounding location of the three-dimensional object based on the three-dimensional object attribute information sent from the three-dimensional object detection section 54, when the three-dimensional object is detected by the three-dimensional object detection section 54. For this purpose, the grounding plane mark output section 64 includes: a grounding plane center calculation section 64a; a grounding plane size calculation section 64b; a grounding plane inclination calculation section 64c; and a grounding plane mark storing section 64d. In this embodiment, the grounding plane mark output by the grounding plane mark output section 64 is in a shape of an ellipse. It is preferable that a ratio of a major axis to a minor axis thereof is approximately 2.5 to 1, but this ratio varies depending on a shape of a display region of the overhead view image allotted on the monitor.

The grounding plane center calculation section 64a is configured to calculate a grounding plane center position of the three-dimensional object in the overhead view image, based on the location of the three-dimensional object contained in the three-dimensional object attribute information. The grounding plane size calculation section 64b is configured to calculate a size of the grounding plane mark based on a width of the three-dimensional object seen from the own vehicle contained in the three-dimensional object attribute information so that the major axis of the grounding plane mark becomes larger than such a width in the overhead view image. The grounding plane inclination calculation section 64c is configured to calculate an inclination angle (posture) of the grounding plane mark at which the major axis of the grounding plane mark becomes orthogonal to a straight line connecting the grounding plane center position of the three-dimensional object calculated by the grounding plane center calculation section 64a and a vehicle center. The grounding plane mark storing section 64d is configured to store image data of the grounding plane mark having a size and a posture that can be calculated by the grounding plane size calculation section 64b and the grounding plane inclination calculation section 64c, respectively. The grounding plane mark storing section 64d can store a plurality of the grounding plane marks. The grounding plane mark output section 64 is configured to extract the suitable grounding plane mark (image data) from the grounding plane mark storing section 64d, and output the extracted grounding plane mark to the image composition section 55, together with data of the grounding plane center position calculated by the grounding plane center calculation section 64a.

It should be noted that, instead of the grounding plane mark storing section 64d storing in advance all of the potentially usable grounding plane marks (image data), a basic image alone may be stored from which a desired grounding plane mark is generated. Alternatively, only a generation algorithm of the grounding plane mark (image data) may be stored and the grounding plane mark having the size and the posture calculated by the grounding plane size calculation section 64b and the grounding plane inclination calculation section 64c, respectively, may be created every time. In addition, when the change of the size of the grounding plane mark is not desired, the grounding plane size calculation section 64b can be omitted. Alternatively, there may be added a function of coloring the grounding plane mark with an arbitrarily selected color.

The image composition section 55 is configured to superimpose an illustration or picture of the own vehicle at a center of the omni-directional overhead view image of the vehicle generated in the overhead view image generation section 61, when the three-dimensional object detection section 54 does not detect the three-dimensional object.

When the three-dimensional object detection section 54 detects the three-dimensional object, the image composition section 55 receives the overhead view image and the three-dimensional object image clipped from the overhead view image, sent from the three-dimensional object clipping section 63, as well as the grounding plane mark and arrangement data of the grounding plane mark (data of the grounding plane center position), sent from the grounding plane mark output section 64. The image composition section 55 is configured to perform a layer composition in which the overhead view image from which the three-dimensional object region was clipped is placed on a rearmost layer, the grounding plane mark is placed on a back layer, and the clipped three-dimensional object region is placed on a front layer, to thereby generate the overhead view image in which the grounding plane mark in an ellipsoidal shape is added to the grounding plane of the three-dimensional object.

In both cases, the generated overhead view image is put into a predetermined template, and transmitted as monitor display image for vehicle driving assistance to the frame memory 56. The monitor display image transmitted to the frame memory 56 is displayed on the monitor 21 through the display control section 71.

Figure 5:
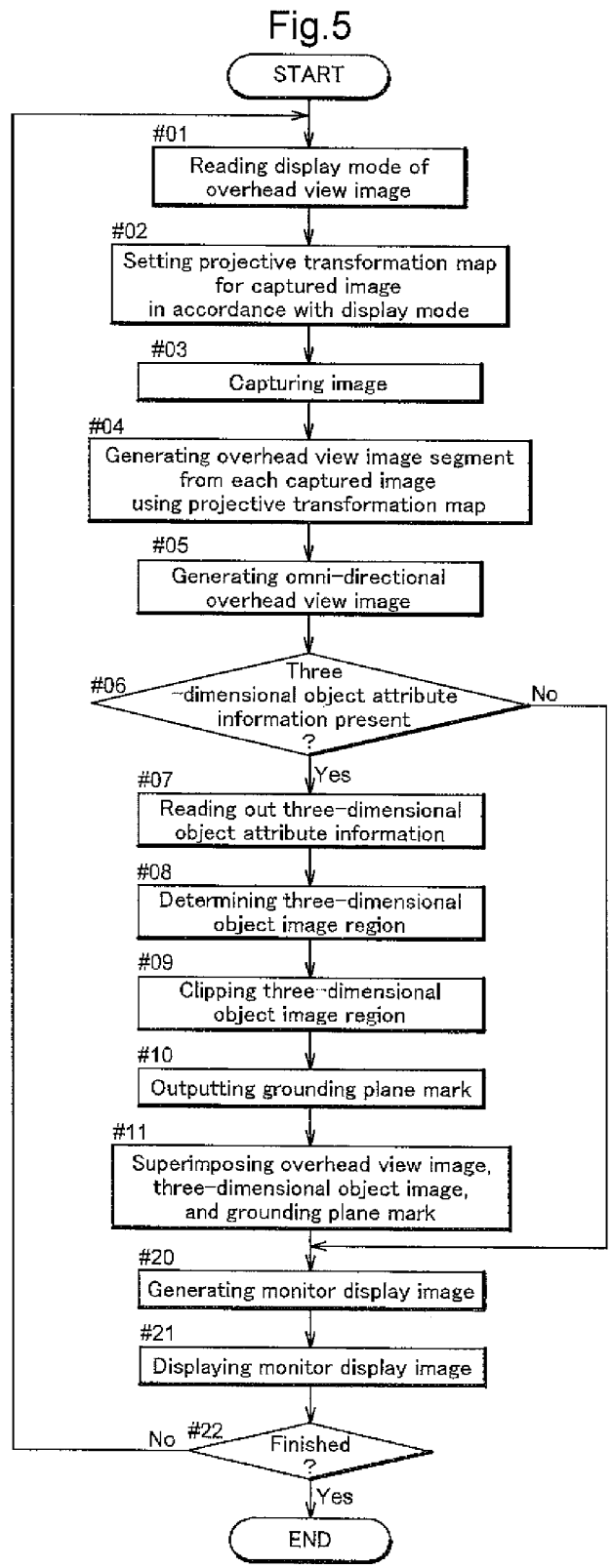
FIG. 5 is a flow chart showing a routine of displaying the overhead view image.

Next, a flow of displaying the overhead view image, using the vehicle surroundings monitoring system in which the image generator configured as described above is incorporated, will be described with reference to a flow chart of FIG. 5.

When a routine of displaying the overhead view image is started for the purpose of monitoring the vehicle surroundings, first, a display mode of the overhead view image is read which is set manually in accordance with the driver's preference or set by default (#01). Herein, the display mode of the overhead view image means items that defines the captured image and the position of the virtual viewpoint which are used when the overhead view image around the vehicle is generated, and items that defines the layout of the generated overhead view image on the monitor screen. A map for the projective transformation used in the overhead view image generation section 61 in accordance with the display mode of the overhead view image read in is set for every captured image of the on-board camera 1 to be used (#02). The images are captured by the four on-board cameras 1 (#03). An overhead view image segment is generated from each of the captured images using each set map (#04). The generated overhead view image segments are combined and the omni-directional overhead view image around the vehicle is generated (#05).

It is checked whether or not the three-dimensional object attribute information is output from the three-dimensional object detection section 54 (#06). When the three-dimensional object attribute information is not output ("No" branch at #06), it is interpreted that all of the captured images do not contain the three-dimensional object to which attention is paid. The overhead view image (picture, illustration, symbol or the like) of the vehicle which is set in advance is arranged at a location of the own vehicle in the overhead view image generated at the step #05, and the overhead view image (monitor display image) to be displayed on the monitor is generated (#20). The generated monitor display image is displayed on the monitor 21 (#21). Unless there is an instruction to finish the routine of displaying the overhead view image, the procedure goes back to the step #01 ("No" branch at #22) and the routine will be repeated.

When the checking at the step #06 reveals that the three-dimensional object attribute information is output ("Yes" branch at #06), data, such as location, type, posture, size or the like regarding the recognized three-dimensional object contained in the three-dimensional object attribute information is read out (#07). Based on the read data related to the location of the three-dimensional object, the image region of the three-dimensional object is determined in the overhead view image (#08).

Figure 6:
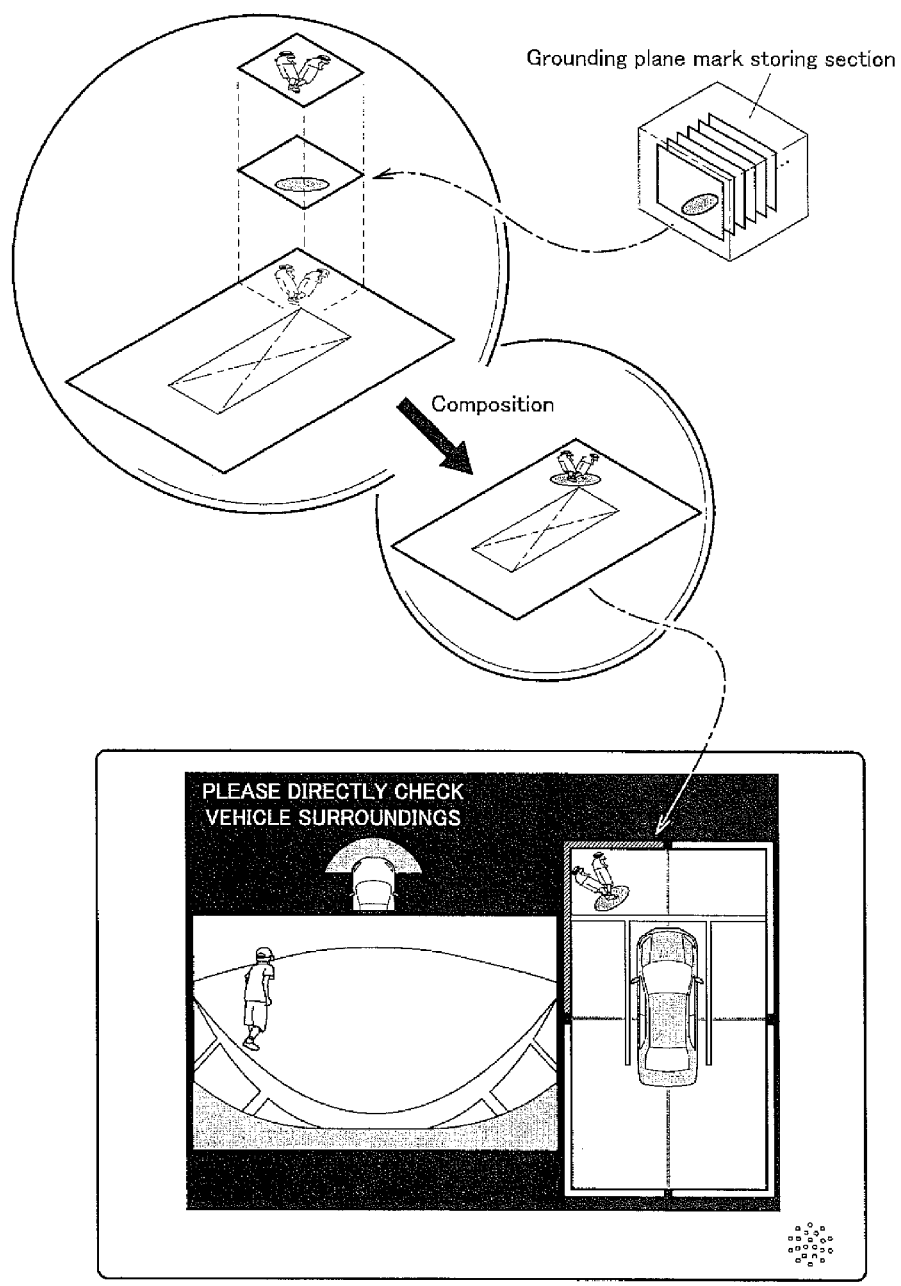
FIG. 6 is a schematic drawing illustrating generation and display of the overhead view image with the grounding plane mark.

Based on the three-dimensional object attribute information, the three-dimensional object clipping section 63 clips the three-dimensional object image region from the overhead view image (#09), and the grounding plane mark output section 64 outputs the grounding plane mark suitable for the three-dimensional object of interest (#10). With this configuration, in the image composition section 55, the overhead view image in which the grounding plane mark in an ellipsoidal shape is added to the grounding plane of the three-dimensional object is generated (#11). As illustrated in FIG. 6, the overhead view image with the grounding plane mark is generated as monitor display image (#20), and the generated monitor display image is displayed on the monitor 21 (#21). In the monitor screen illustrated in FIG. 6, the overhead view image with the grounding plane mark is arranged side by side with a front camera captured image in which the three-dimensional object (herein pedestrian) is captured.

(1) In the embodiment described above, the image obtained from the captured image through the projective transformation utilizing a viewpoint above the vehicle and the projecting plane in parallel with the road surface is used as the overhead view image. However, the embodiment is not limited to the overhead view image obtained through such a projective transformation. For example, the overhead view image may be obtained using a concave curved face or a flexed curved face as projecting plane.

Figure 7:
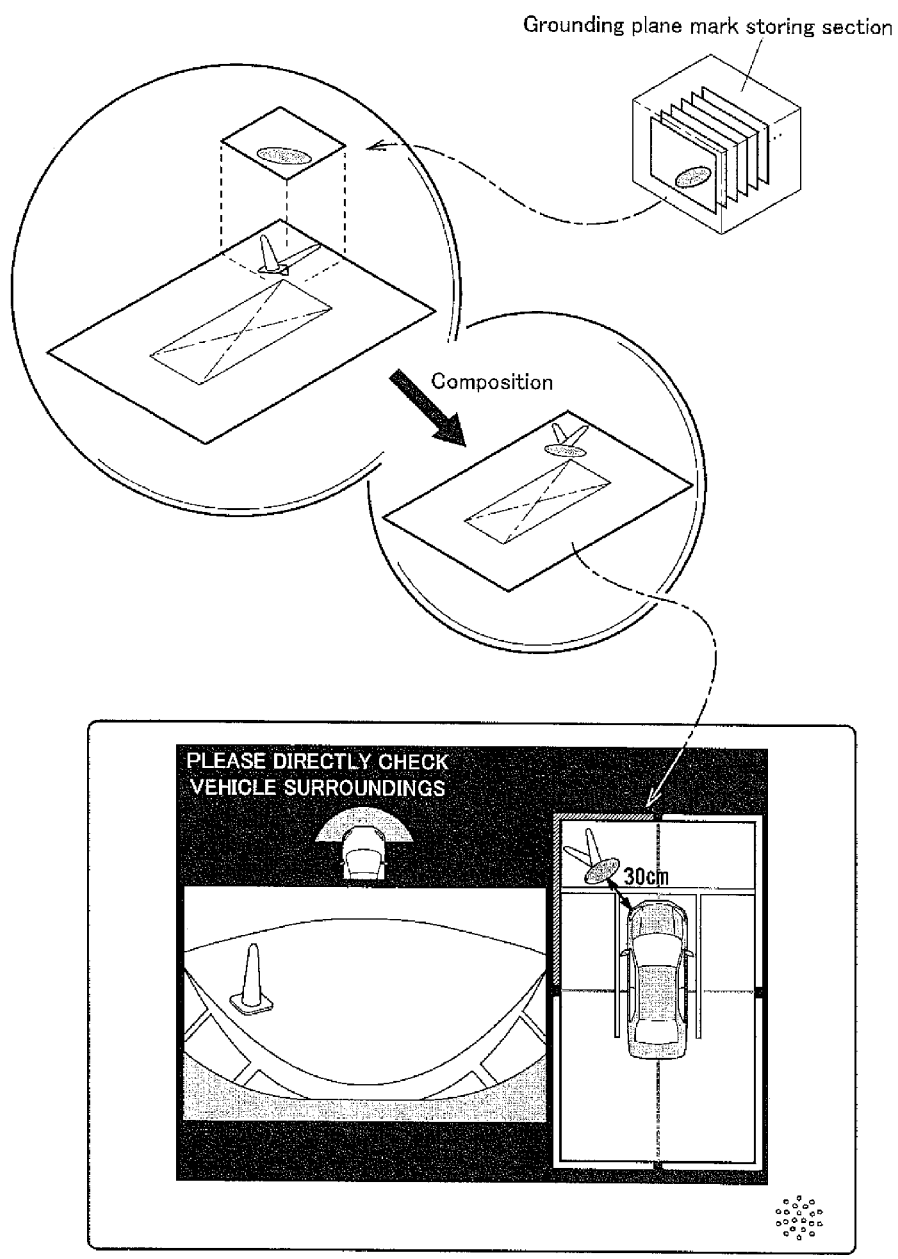
FIG. 7 is a schematic drawing illustrating generation and display of the overhead view image with the grounding plane mark according to another embodiment.

(2) In the embodiment described above, as illustrated in FIGS. 2 and 6, the grounding plane mark is superimposed in the overhead view image in such a manner that the ground plane mark becomes a background of the three-dimensional object. In order to simplify this composition, as illustrated in FIG. 7, image composition can be used in which the grounding plane mark is simply superimposed at the grounding location of the three-dimensional object in the overhead view image.

(3) Since the three-dimensional object attribute information contains the location of the detected three-dimensional object, the distance (minimum distance is preferable) from the own vehicle can be obtained. Alternatively, the distance thereof may be obtained from the captured image. At any rate, the distance between the detected three-dimensional object and the vehicle is obtained, and thus this distance can be contained in the monitor display image as distance from the grounding location of the three-dimensional object to the vehicle. For example, as shown in FIG. 7, when the distance is displayed in the vicinity of the grounding plane mark, the driver can understand the accurate distance from the three-dimensional object.

(4) In the embodiment described above, the three-dimensional object detection section 54 is configured to generate the three-dimensional object attribute information, by detecting the three-dimensional object from the captured image using an image recognition technique, and thus incorporated into the image processing module 50. Instead, the three-dimensional object detection section may be provided separately from the image processing module 50. For example, as shown in FIG. 8, there can be applied a three-dimensional object recognition module 30 connected to the image processing module 50 through an in-vehicle communication pathway. The three-dimensional object recognition module 30 has a three-dimensional object sensing section 31 for evaluating detection signals from a plurality of ultrasonic sensors 3 to sense the three-dimensional object, and a three-dimension object recognition section 32 for recognizing the three-dimensional object contained in the image captured by the camera 1. The ultrasonic sensors 3 are provided at both end positions and an intermediate position in each of a front part, a rear part, a left part and a right part of the vehicle, and the object (obstacle) present in the vicinity of the vehicle surroundings can be sensed through the waves reflected therefrom. By processing a return time and an amplitude of the reflected wave in each of the ultrasonic sensors 3, the distance from the vehicle to the object and the size of the object can be estimated, and further, by processing the detection results of all of the ultrasonic sensors 3 over time, a movement of the object or an outer shape in a transversal direction can be estimated. In this case, it is satisfactory that the three-dimensional object detection section 54 provided in the image processing module 50 simply has a function of receiving the three-dimensional object attribute information sent from the three-dimensional object recognition module 30. It should be noted that, instead of the ultrasonic sensor 3, laser radar or infrared may be used. In addition, there may be adopted a configuration in which the three-dimensional object detection section 54 detects the three-dimensional object by the image recognition technique, based on three-dimensional object location information from the image processing module 50.

The embodiments are applicable to any system which monitors the surroundings of the vehicle using the overhead view image.

REFERENCE SIGNS LIST

1: Camera
21: Monitor
30: Three-dimensional object recognition module (three-dimensional object detection section)
50: Image processing module
53: Image generation section
54: Three-dimensional object detection section
55: Image composition section
60: Normal image generation section
61: Overhead view image generation section
62: Mapping table
63: Three-dimensional object clipping section
64: Grounding plane mark output section
64a: Grounding plane center calculation section
64b: Grounding plane size calculation section
64c: Grounding plane inclination calculation section
64d: Grounding plane mark storing section

What is claimed is:

1. An image generator comprising:
an overhead view image generation section for generating an overhead view image by performing a projective transformation, with a virtual viewpoint above a vehicle, of an image captured by an on-board camera for capturing an image of a surrounding region of the vehicle;
a three-dimensional object detection section for recognizing a three-dimensional object present in the surrounding region and outputting three-dimensional object attribute information showing an attribute of the three-dimensional object; and
an image composition section for generating a monitor display image for vehicle driving assistance by performing image composition of a grounding plane mark showing a grounding location of the three-dimensional object with a portion at the grounding location in the overhead view image, based on the three-dimensional object attribute information.

2. The image generator according to claim 1, wherein the grounding plane mark is in a flattened shape, and an inclined posture of the grounding plane mark is determined so that a line of direction from the vehicle to the three-dimensional object becomes orthogonal to a major axis of the grounding plane mark.

3. The image generator according to claim 1, wherein the grounding plane mark is in a shape of an ellipse.

4. The image generator according to claim 1, wherein a size of the grounding plane mark is determined in accordance with the three-dimensional object attribute information.

5. The image generator according to claim 1, wherein a size of the grounding plane mark is set larger than a width of the three-dimensional object in the overhead view image, based on a width of the three-dimensional object contained in the three-dimensional object attribute information.

6. The image generator according to claim 1, wherein in the image composition performed by the image composition section, a three-dimensional object image layer containing the three-dimensional object alone is generated from a basic image layer containing the overhead view image, the grounding plane mark is placed between the basic image layer and the three-dimensional object image layer, and at the same time, positioned at the grounding location of the three-dimensional object in the overhead view image.

7. The image generator according to claim 1, wherein in the image composition performed by the image composition section, the grounding plane mark is superimposed on the grounding location of the three-dimensional object in the overhead view image.

8. The image generator according to claim 1, wherein the overhead view image generation section includes:
- a grounding plane mark storing section for storing a plurality of the grounding plane marks; and
- a grounding plane mark output section for extracting an appropriate grounding plane mark from the grounding plane mark storing section based on the three-dimensional object attribute information, and sending the selected grounding plane mark to the image composition section.

9. The image generator according to claim 1, wherein an indication of a distance from the grounding location of the three-dimensional object to the vehicle is added in the vicinity of the grounding plane mark.

* * * * *